(12) United States Patent
Witkowski et al.

(10) Patent No.: US 6,345,272 B1
(45) Date of Patent: Feb. 5, 2002

(54) REWRITING QUERIES TO ACCESS MATERIALIZED VIEWS THAT GROUP ALONG AN ORDERED DIMENSION

(75) Inventors: Andrew Witkowski, Foster City, CA (US); Randall Bello, Hampton, NH (US); Mohamed Ziauddin, Fremont, CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/361,688

(22) Filed: Jul. 27, 1999

(51) Int. Cl.[7] ............................................. G06F 17/30
(52) U.S. Cl. ................... 707/4; 707/2; 707/6; 707/102; 707/103; 706/16; 709/204; 717/2
(58) Field of Search ............................. 707/2, 4, 6, 10, 707/3, 5, 1, 102, 103; 705/26, 27; 706/16; 709/204; 717/2; 702/2, 4, 10

(56) References Cited

U.S. PATENT DOCUMENTS

| | | | | |
|---|---|---|---|---|
| 5,404,506 A | * | 4/1995 | Fujisawa et al. ................ | 707/4 |
| 5,418,946 A | * | 5/1995 | Mori ............................. | 707/1 |
| 5,548,755 A | * | 8/1996 | Leung et al. ................... | 707/2 |
| 5,584,024 A |   | 12/1996 | Schwartz ........................ | 707/4 |
| 5,598,559 A | * | 1/1997 | Chaudhuri ...................... | 707/2 |
| 5,659,728 A | * | 8/1997 | Bhargava et al. .............. | 707/2 |
| 5,765,147 A | * | 6/1998 | Mattos et al. .................. | 707/4 |
| 5,774,692 A | * | 6/1998 | Boyer et al. ................... | 707/3 |
| 5,778,355 A | * | 7/1998 | Boyer et al. ................... | 707/2 |
| 5,812,840 A | * | 9/1998 | Shwartz ......................... | 707/4 |
| 5,826,077 A | * | 10/1998 | Blakeley et al. .............. | 707/4 |
| 5,897,632 A | * | 4/1999 | Dar et al. ...................... | 707/2 |
| 5,970,482 A | * | 10/1999 | Pham et al. .................. | 706/16 |
| 5,974,407 A |   | 10/1999 | Sacks ........................... | 707/2 |
| 5,991,754 A | * | 11/1999 | Raitto et al. .................. | 707/2 |
| 6,108,651 A | * | 8/2000 | Guha ............................ | 707/4 |
| 6,125,360 A | * | 9/2000 | Witkowski et al. ............ | 707/2 |
| 6,134,543 A | * | 10/2000 | Witkowski et al. ............ | 707/2 |
| 6,199,063 B1 | * | 3/2001 | Colby et al. ................... | 707/4 |

OTHER PUBLICATIONS

Chaudhury, Surajit et al., "Optimizing Queries with Materialized Views", Proceedings of the Eleventh International Conference on Data Engineering, Mar. 6–10, 1995, pp. 190–200.*

Gopalkrishnan, Vivekanand et al., "Issues of Object–Relational View in Data Warehousing Environment", 1998 IEEE International Conference on Systems, Man, and Cybernetics, Oct. 11–14, 1998, vol. 3, pp. 2732–2737.*

Kuno, Harumi et al., "Augmented Inherited Multi–Index Structure for Maintenance of Materialized Path Query Views", Proceedings of the Sixth International Conference on Research Issues in Data Engineering, Feb. 26–27, 1996, pp. 128–137.*

Segev, Aris et al., "Maintaining Materialized View in Distributed Databases", Proceedings of the Fifth International Conference on Data Engineering, Feb. 6–10, 1989, pp. 262–270.*

(List continued on next page.)

Primary Examiner—Hosain T. Alam
Assistant Examiner—Shahid Alam
(74) Attorney, Agent, or Firm—Hickman Palermo Truong & Becker LLP; Marcel Bingham

(57) ABSTRACT

A method and apparatus are provided for rewriting aggregate queries to access a materialized view when (1) the queries place a restriction on an ordered dimension, (2) the materialized view aggregates the information referenced in the query and groups by the same dimension, and (3) the materialized view groups the information at a coarser level of granularity than the granularity associated with the restriction contained in the aggregate queries.

20 Claims, 13 Drawing Sheets

Sales_location 801

| Sales_region 814 | Sales_district 812 | Sales_office 810 |
|---|---|---|
| 1 | 1 | 1 |
| 3 | 1 | 1 |
| 9 | 1 | 1 |
| 31 | 3 | 1 |
| 37 | 3 | 1 |
| 39 | 3 | 1 |

Chart 850

| | Dimension Table Column | Child of | Granule | Range | Order |
|---|---|---|---|---|---|
| 870 — | Sales_region 814 | | 1 | 0 - 5 | Sales_region 814 |
| 871 — | Sales_district 812 | Sales_region 814 | 1 | 0 - 9 | Sales_district 812 |
| 872 — | | | 3 | 30 - 39 | Sales_district 812 |
| 874 — | Sales_office 810 | Sales_district 812 | | | |

OTHER PUBLICATIONS

Bhargava, Gautam et al., "Hypergraph based reorderings of outer join queries with complex predicates, Proceedings of the 1995 ACM SIGMOND International Conference on Management of Data and Symposium on Principles of Database Systems", May 22–25, 1995, AC.

Bhagrava, Gautam et al., "Efficient processing of outer joins and aggregate junctions", Proceedings of the Twelfth International Conference Data Engineering, 1996., Feb. 26–Mar. 1, 1996, pp. 441–449.

Biggs, Maggie, "Oracle8 still in pole position", InfoWorld, Framingham; Dec. 15, 1997, vol. 19, Issue 50, p. 1, 97, ISSN: 01996649.

Chen, Arbee, "Outerjoin Optimization in Multidatabase Systems", Proceedings of the Second International Symposium on Databases in Parallel and Distributed Systems, 1990, Jul. 2–4, 1990, pp. 211–218.

Pang, HweeHwa et al., "Partially Preemptble Hash Joins", Proceedings of the 1993 ACM SIGMOND international conference on Mangement of data, 1993, pp. 59–68.

Ross, Kenneth et al., "Materialized view maintenance and integrity constraint checking: trading space for time", Proceedings of the 1996 ACM SIGMOND international conference on Management of data, Jun. 3–6, 1996, pp. 447–458.

O'Neil et al., "Multi–Table Joins Through Bitmapped Join Indices", SIGMOND Record, vol. 24, No. 3, Sep. 1995, pp. 8–11.

Yan, Weipeng et al., "Performing Group–By before Join", Proceedings of the $10^{th}$ International Conference on Data Engineering, 1994, Feb. 14–18, 1994, pp. 89–100.

Lee, Byung Suk et al., "Outer joins and filters for instantiating objects from relational databases through views", IEEE Transactions on Knowledge and Data Engineering, Feb. 1994, vol. 6, Issue 1, pp. 108–119.

Log, Ming–Ling et al., "Spatial Hash–Joins", Proceedings of the 1996 ACM SIGMOND International Conference on Management of Data, 1996, pp. 247–258.

Marek, Robert et al., "TID Hash Joins", Proceedings of the third international conference in information and knowledge management, 1994, No. 2–, Dec. 2, 1994, pp. 42–49.

Mishra, Priti et al., "Join Proceesing in Relational Databases", ACM Computing Surveys, vol. 24, No. 1, Mar. 1992, pp. 63–113.

* cited by examiner

210
Query 210 = SELECT
　　　　SUM($Amt),
　　　　region
　　FROM Sales
　　WHERE date between 01/01/98 and 12/31/98
　　GROUP BY
　　　　region 280
Query 280 = SELECT
　　　　SUM(Sum_Sales), region
　　FROM MVSales
　　WHERE date between 01/01/1998 and 12/31/1998
　　GROUP BY
　　　　region Table Sales 250

| Date 260 | Region 262 | Product 264 | $Amt 266 |
|---|---|---|---|
|  |  |  |  |
|  |  |  |  |
|  |  |  |  |
|  |  |  |  |
|  |  |  |  |
|  |  |  |  |
|  |  |  |  |

270
MVSales 270 =　SELECT
　　　　SUM($AMT) as Sum_Sales,
　　　　Date, region
　　FROM sales
　　GROUP BY
　　　　Date, region

FIG. 2

401 — QBG =     SELECT
                    region,
                    sum($Amt)
                FROM
                    sales
          ⎧ WHERE
     403 ⎨     date between '01/01/1997' and '12/31/1998'
                GROUP BY
                    region 421 — MVBG =    SELECT
                    region,
                    to_date(date, 'YYYY') as year,
                    sum($Amt) as sum_sales
                FROM
                    sales                                    — 423
                GROUP BY
                    region,
                    year 441 — QrwBG =   SELECT
                    region,
                    SUM(sum_sales)
                FROM
                    MVBG
          ⎧ WHERE
     442 ⎨     year between '1997' and '1998'
                GROUP BY
                    region

FIG. 4

501 — QBGQ =     SELECT
                    region,
                    sum($Amt)
                FROM
                    sales
        503 — { WHERE
                    date between '01/01/1997' and '01/31/1997'
                GROUP BY
                    region 521 — MVBGQ =    SELECT
                    region,
                    to_date(date, 'YYYY-Q') as quarter,
                    sum($Amt) as sum_sales
                FROM
                    sales
                GROUP BY
                    region,
                    quarter 541 — QrwBGQ =   SELECT
                    region,
                    SUM(sum_sales)
                FROM
                    MVBGQ
        543 — { WHERE
                    quarter = '1997-1'
                GROUP BY
                    region

FIG. 5

601 — QUB =   SELECT
              region,
              sum($Amt)
          FROM
              sales
       ⎰ WHERE
603 ⎱      date between '12/15/1991' and '01/31/1997'
          GROUP BY
              region

FIG. 6A

643 \ QU =     SELECT    /660
                region,
                sum(sales)
              FROM
                sales
       ⎧  WHERE
668 ─⎨      date between '12/15/1991' and '12/31/1991'
       ⎩  GROUP BY
                region

UNION ALL           /670

SELECT
                region,
                SUM(sum_sales)
              FROM       /421
                MVBG
       ⎧  WHERE
678 ─⎨      year between '1992' and '1996'
       ⎩  GROUP BY
                region

UNION ALL           /680

SELECT
                region,
                sum(sales)
              FROM
                sales
       ⎧  WHERE
688 ─⎨      date between '01/01/97' and '01/31/1997'
       ⎩  GROUP BY
                region

FIG. 6B

640 — MVBGM =      SELECT
                      region,
                      to_date(date, 'YYYY-MM') as month,
                      sum($Amt) as sum_sales
                  FROM
                      sales
                  GROUP BY
                      region,
                      month

FIG. 6C

```
QUMY =          SELECT                      ─660
                    region,
                    sum(sales)
                FROM
                    sales
       ┌        WHERE
658──▶ ┤            date between '12/15/1991' and '12/31/1991'
       └        GROUP BY
                    region

UNION ALL        ──670

SELECT
                    region,
                    SUM(sum_sales)
                FROM         ──421
                    MVBG
       ┌        WHERE
678──▶ ┤            year between '1992' and '1996'
       └        GROUP BY
                    region

UNION ALL        ──650

SELECT
                    region,
                    SUM(sum_sales)
                FROM         ──640
                    MVBGM
       ┌        WHERE
688──▶ ┤            month = '1997 - 01'
       └        GROUP BY
                    region
```

FIG. 6D

Sales_location 801

| Sales_region 814 | Sales_district 812 | Sales_office 810 |
|---|---|---|
| 1 | 1 | 1 |
| 3 | 1 | 1 |
| 9 | 1 | 1 |
| 31 | 3 | 1 |
| 37 | 3 | 1 |
| 39 | 3 | 1 |

Chart 850

| Dimension Table Column | Child of | Granule | Range | Order |
|---|---|---|---|---|
| Sales_region 814 | | 1 | 0 - 5 | Sales_region 814 |
| Sales_district 812 | Sales_region 814 | 1 | 0 - 9 | Sales_district 812 |
| Sales_office 810 | Sales_district 812 | 3 | 30 - 39 | Sales_district 812 |

Office Sales 970

| office_location 972 | dollar_amt 974 |
|---|---|
|  |  |
|  |  |
|  |  |

901 — QUB =   SELECT   sales_office,
                       sum(dollar_amt)
              FROM     office_location,
                       sales_location
              WHERE    office_location = sales_office and
       903 —           sales_office between 0 and 9
              GROUP BY
                       sales_office 921 — MVUB =  SELECT   sales_office,
                       sales_district,
                       sum(dollar_amt) as sum_dollar_amt
              FROM     office_location,
                       sales_location
              WHERE    office_location = sales_office
              GROUP BY
                       sales_office, sales_district

FIG. 9A

941 — QrwUB =  SELECT  sales_office,
                      sum_dollar_amt
               FROM   MVUB
      943 —    WHERE  sales_district = 1

FIG. 9B

REWRITING QUERIES TO ACCESS MATERIALIZED VIEWS THAT GROUP ALONG AN ORDERED DIMENSION

FIELD OF THE INVENTION

The present invention relates to rewriting queries, and in particular, rewriting queries to access a materialized view.

BACKGROUND OF THE INVENTION

In a database management system (DBMS), data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

The present invention is not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

For various reasons, it may not be desirable for certain users to have access to all of the columns of a table. For example, one column of an employee table may hold the salaries for the employees. Under these circumstances, it may be desirable to limit access to the salary column to management, and allow all employees to have access to the other columns. To address this situation, the employees may be restricted from directly accessing the table. Instead, they may be allowed to indirectly access the appropriate columns in the table through a "view".

A view is a logical table. As logical tables, views may be queried by users as if they were a table. However, views actually present data that is extracted or derived from existing tables. Thus, the problem described above may be solved by (1) creating a view that extracts data from all columns of the employee table except the salary column, and (2) allowing all employees to access the view.

A view is defined by metadata referred to as a view definition. The view definition contains mappings to one or more columns in the one or more tables containing the data. Typically, the view definition is in the form of a database query. Columns and tables that are mapped to a view are referred to herein as base columns and base tables of the view, respectively. The data maintained in the base columns is referred to herein as base data.

The data presented by conventional views is gathered and derived on-the-fly from the base tables in response to queries that access the views. That data gathered for the view is not persistently stored after the query accessing the view has been processed. Because the data provided by conventional views is gathered from the base tables at the time the views are accessed, the data from the views will reflect the current state of the base tables. However, the overhead associated with gathering the data from the base tables for a view every time the view is accessed may be prohibitive.

A materialized view, on the other hand, is a view for which a copy of the view data is stored separate from the base tables from which the data was originally gathered and derived. The data contained in a materialized view is referred to herein as ("materialized data"). Materialized views eliminate the overhead associated with gathering and deriving the view data every time a query accesses the view. As new data is periodically added to the base tables, the materialized view needs to be updated (i.e., refreshed) to reflect the new base data.

Computer database systems that are used for data warehousing frequently maintain materialized views that contain pre-computed summary information in order to speed up query processing. Such summary information is created by applying an aggregate function, such as SUM, COUNT, or AVERAGE, to values contained in the base tables. Materialized views that contain pre-computed summary information are referred to herein as "summary tables" or more simply, "summaries". Base tables from summary information is generated are referred to as fact tables.

Summary tables typically store aggregated information, such as "sum of PRODUCT_SALES, by region, by month." Other examples of aggregated information include counts of tally totals, minimum values, maximum values, and average calculations. Summary tables are used to reduce the overhead associated with processing queries that request summary information. Because the summary information is already pre-computed, it need not be re-computed during the execution of each query that requests summary information. Instead, the pre-computed summary values can be directly retrieved from the summary columns of the summary table.

When a database user knows that a particular materialized view contains the data desired by the user, the user can formulate a query that extracts the desired data directly from that materialized view. However, there are numerous circumstances in which a user will design a query that does not reference a materialized view to retrieve a set of data that can be most efficiently retrieved by accessing the materialized view. For example, the user may not be aware of all of the materialized views available in the database, or may not be sure how a particular materialized view could be used to retrieve the desired information.

Even when the user is aware that materialized views are available that have data desired by the user, the user may prefer to have the server transparently rewrite the query in terms of the materialized views, rather than writing the query to directly reference the materialized views. By allowing the server to rewrite the query, the database administrator may easily add and drop materialized views without affecting the application code that imbeds the user query. For example, if a user query is rewritten by the server to use a particular materialized view MV1, then the application will not break if the database administrator decides to drop MV1. In contrast, if the user query directly references MV1 in the application code, then dropping MV1 will break the application.

In light of the foregoing, some database servers include mechanisms for rewriting queries that do not reference materialized views in a way that causes them to reference materialized views. The execution of the rewritten query is often considerably improved relative to the original query because the relational objects accessed by the rewritten query are (e.g. the materialized views) much smaller than the objects referenced in the original query (e.g. the base tables), and/or the number of objects used by the rewritten query is less than the number of objects referenced in the original query.

For example, a summary can correspond to a query which joins two tables and performs data aggregation to compute sum-of-sales by city, and stores the materialized result in a table. If a user issues a query Q which requests sum-of-sales by city, then Q can be transparently rewritten to access pre-computed data stored in the summary table. Because of the rewrite, the result for Q can be quickly produced by simply scanning the summary table instead of joining two tables and then aggregating the data.

One type of query that is rewritten is an aggregate queries that places a restriction on a hierarchical dimension. This type of query may be rewritten to use a materialized view that groups data along the same hierarchical dimension. A dimension is an attribute of a set of data, such as a column of a table. A hierarchical dimension is a dimension where there is a hierarchical relationship between the values of the dimension. A common example of a hierarchical dimension is time. Possible values for time include a particular day, month, quarter, or year. The values are hierarchically related because a particular day is associated with a particular month, which is associated with a particular quarter, which is associated with a particular year.

FIG. 1 depicts a dimension hierarchy 100, an illustrative dimension hierarchy for a time dimension. A dimension hierarchy is a hierarchy of values in an hierarchical dimension. Each node in a dimension hierarchy represents a value in a dimension. Node 102 represents 1998-1, a value representing the first quarter in 1998. Node 104, 106, 108 represents values '1998-01', '1998-02', and '1998-03', which each represent months. The following definitions are helpful to describing dimension hierarchies.

DIMENSION HIERARCHY DEFINITIONS

Each node in dimension hierarchy 100 represents a granule. A granule is a particular value in the hierarchical dimension.

Each granule resides at one of the levels in the hierarchy. Each level of the hierarchy has a "level of granularity". Levels that are higher in the hierarchy have coarser levels of granularity, while levels that are lower in the hierarchy have finer levels of granularity. For example, Quarter level 152, which is higher than month level 154 in the hierarchy, has a coarser level of granularity than month level 154.

Each level of granularity is associated with a set of granules. For example, quarter level of granularity 152 is associated with granules 1998-1, 1998-2, 1998-3, and 1998-4, which correspond to quarters. Similarly, month level 154 is associated with granules 1998-01, 1998-02, etc. that correspond to months.

The "parent granule" of a particular granule is the granule associated with the particular granule that is at the hierarchical level immediately above the hierarchical level of the particular granule. Thus, 1998-1 is the parent granule for granules 1998-01, 1998-02, and 1998-03.

A coarser granule, with respect to a particular granule, is a granule associated with a level of granularity that is coarser than the level of granularity of the particular granule. Thus, with respect to granule 1998-01, granules 1998 (represented by node 180) and 1998-1 are coarser granules.

A finer granule, with respect to a particular granule, is a granule associated with a level of granularity that is finer than the level of granularity of the particular granule.

CONVENTIONAL REWRITES OF AGGREGATE QUERIES THAT RESTRICT ALONG A DIMENSION

Aggregate queries that restrict a particular dimension at a particular level of granularity may be rewritten by conventional rewrite mechanisms to access summary tables that group data from the fact table along the same dimension when the level of granularity at which the summary table groups the data is the finest level of granularity used by the fact table for that dimension. FIG. 2 illustrates a conventional rewrite of this type of query.

Referring to FIG. 2, aggregate query 210 requests summary information from sales table 250. Sales table 250 contains columns date 260, region 262, product 264, and $Amt 266. Date 260 contains values that represent days. Consequently, days are the finest level of granularity for the time dimension by which information in sales table 250 may be grouped. Query 210 requests summarized data from sales table 250 and restricts column date 260 to between Jan. 1, 1998 and Dec. 31, 1998. Thus, query 210 specifies a restriction on a time dimension.

FIG. 2 also shows the definition of a materialized view (MVSales 270). The illustrated definition defines a summary table that groups data from sales table 250 by date. Thus, MVSales 270 groups data along the same dimension (time) as the dimension specified in the restriction contained in query 210, and at the finest level of granularity of that dimension (date).

Because MVSales 270 groups data along the same dimension (time) as the dimension specified in the restriction contained in query 210, and at the finest level of granularity of that dimension (date), conventional rewrite mechanisms are able to rewrite the query 210 to access MVSales 270. Thus, query 210 is rewritten as query 280.

Unfortunately, conventional rewrite mechanisms do not rewrite aggregate queries to access summary tables when the summary tables group along the same dimension as is used in a restriction of the queries, but where the grouping in the summary table is not done at the finest level of granularity. Summary tables that aggregate data at the finest level of granularity are much bigger than summary tables that aggregate data at coarser levels, and therefore require more work to process when an aggregate query is rewritten to access them.

Based on the foregoing, it is clearly desirable to provide a query rewrite mechanism that is capable of rewriting queries to access materialized views that would otherwise not be rewritten by conventional rewrite mechanisms. In particular, it is desirable to provide a query rewrite mechanism that does not depend on summary tables that group data along the finest granularity of a hierarchical dimension.

SUMMARY OF THE INVENTION

Mechanisms described herein rewrite aggregate queries to access a materialized view when (1) the queries place a restriction on an ordered dimension, (2) the materialized view aggregates the information referenced in the query and groups by the same dimension, and (3) the materialized view groups the information at a coarser level of granularity than the granularity associated with the restriction contained in the aggregate queries.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 shows a query, table, and materialized view definition used to illustrate query rewrites;

FIG. 4 shows illustrative queries and a materialized view definition used to illustrate query rewrites;

FIG. 5 shows illustrative queries and a materialized view definition used to illustrate query rewrites;

FIG. 6A shows an illustrative query and a materialized view definition used to illustrate query rewrites;

FIG. 6B shows illustrative queries and a materialized view definition used to illustrate query rewrites;

FIG. 6C shows a materialized view definition used to illustrate query rewrites;

FIG. 6D shows illustrative queries and a materialized view definition used to illustrate query rewrites;

FIG. 8 is a block diagram showing a dimension table and a chart of information describing an ordered dimension;

FIG. 9A shows illustrative queries, a table, and a materialized view definition used to illustrate query rewrites; and FIG. 9B shows an illustrative rewritten query.

DETAILED DESCRIPTION OF THE PREFERRED EMBODIMENT

A method and apparatus for rewriting queries is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
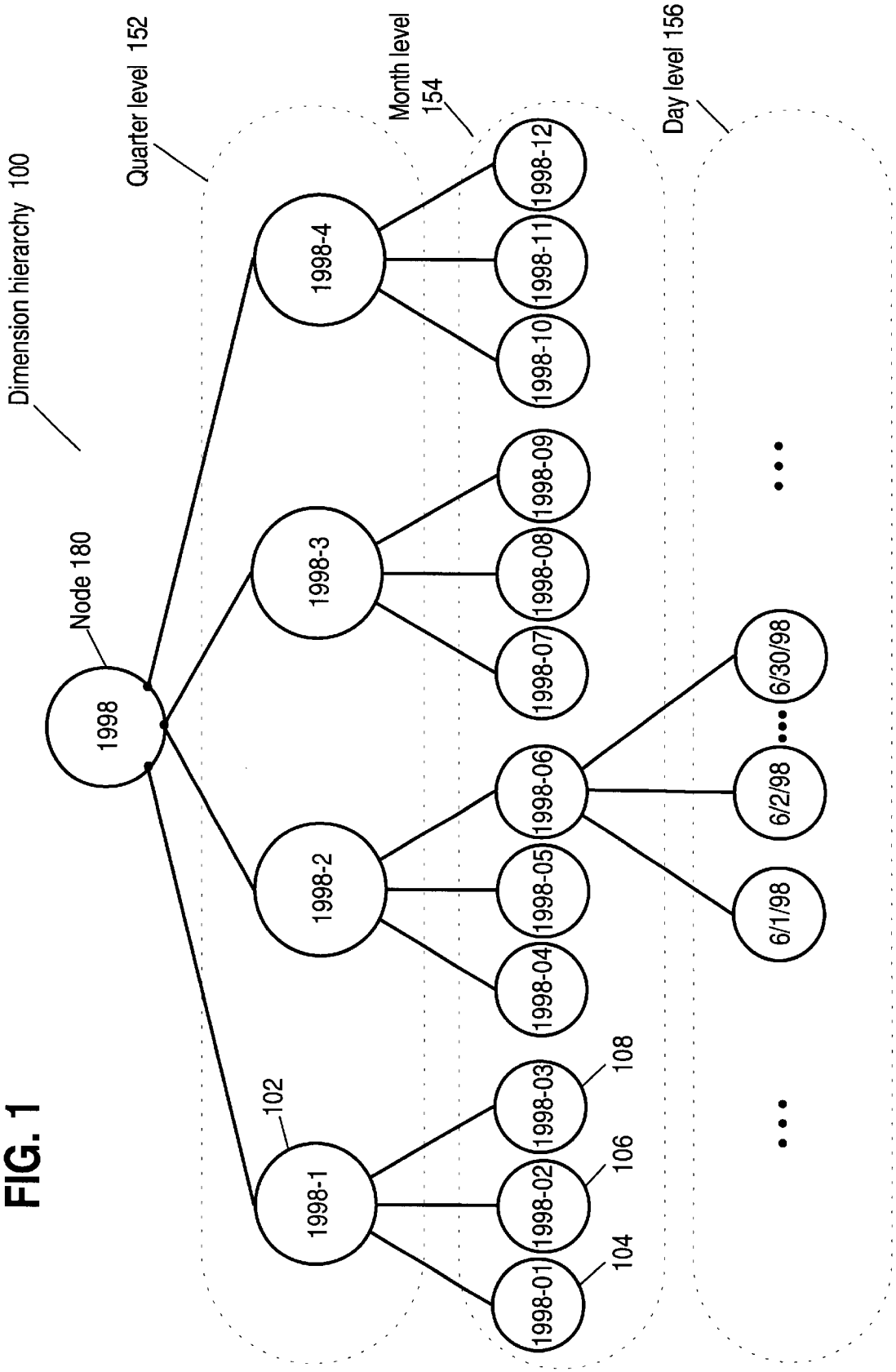
FIG. 1 is block diagram depicting a dimension hierarchy according to an embodiment of the present invention.
Figure 3:
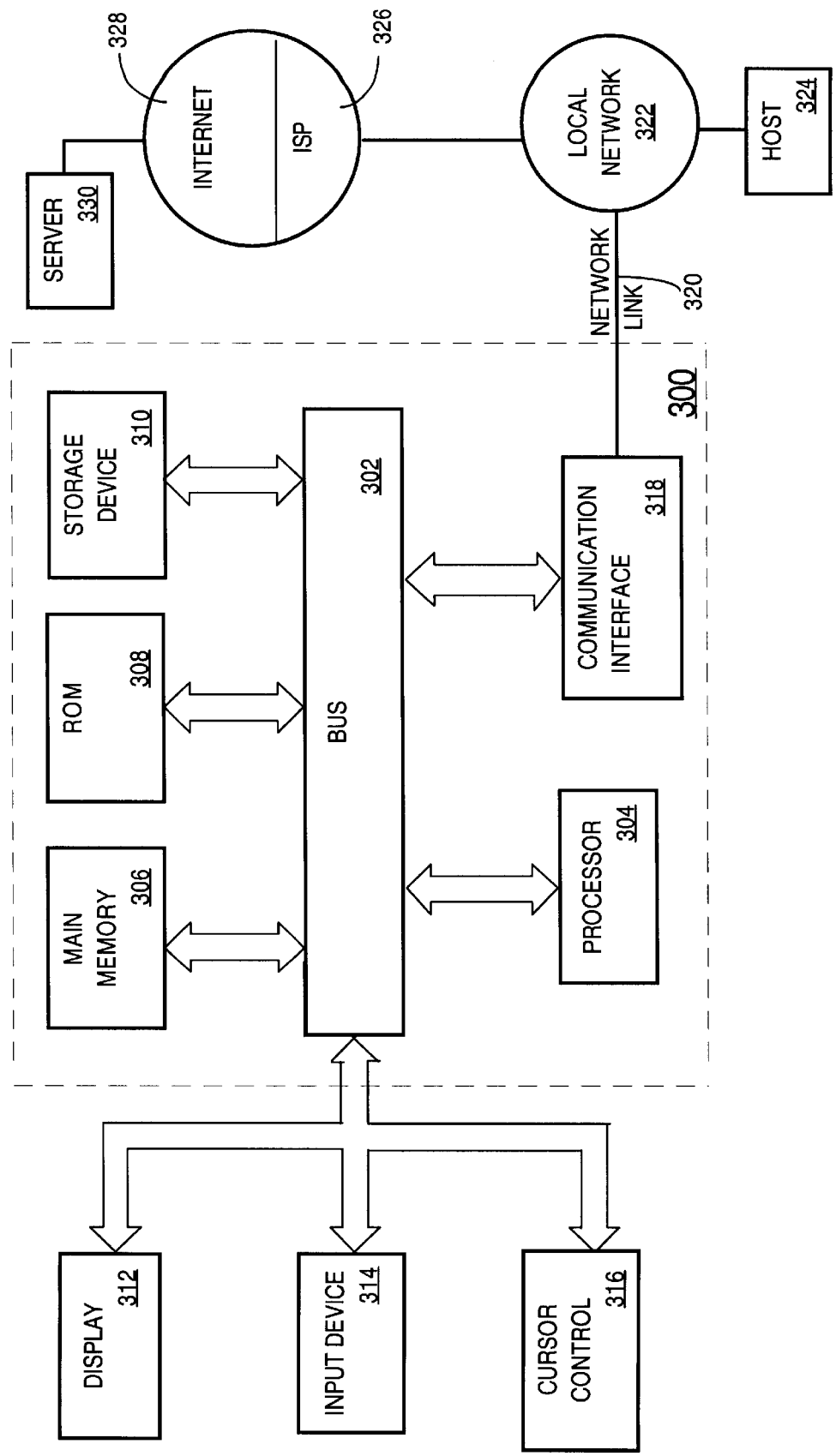
FIG. 3 is an exemplary computer system upon which an embodiment of the present invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for rewriting queries. According to one embodiment of the invention, rewriting queries is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented.

In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for rewriting queries as described herein.

The received code may be executed by processor 304 as it is received, and/or stored in storage device 310, or other non-volatile storage for later execution. In this manner, computer system 300 may obtain application code in the form of a carrier wave.

FUNCTIONAL OVERVIEW

The techniques for rewriting aggregate queries described hereafter rewrite aggregate queries that place restrictions upon ordered dimensions. An ordered dimension is a dimension where an order is associated with the granules at a particular level of granularity, and where each parent granule is associated with a particular range of finer granules. For example, referring to granules represented by dimension hierarchy 100, the granules 1998-01, 1998-02 . . . 1998-12 represent an ordered set of values that represent months. Granule 1998-1 represents a quarter, and is associated with a range of granules that represent months of the first quarter 1998. This range begins with January 1998 inclusively and ends with March 1998 inclusively, and in particular, includes granules 1998-01, 1998-02, and 1998-03.

As another example, particular days (e.g. Jan. 1, 1998) are represented by granules at the day level 156 which is immediately below the month level of granularity 354. There is an order between days. A particular range of days is associated with a parent granule that represents a month. The granules associated with date range Jan. 1, 1998–Jan. 31, 1998 are associated with the granule 1998-01.

According to one embodiment of the invention, techniques are provided to rewrite aggregate queries to access a materialized view when (1) the queries place a restriction on an ordered dimension, (2) the materialized view aggregates the information referenced in the query and groups by the same dimension, and (3) the materialized view groups the information at a coarser level of granularity than the granularity associated with the restriction contained in the aggregate queries. The ability to rewrite queries to access a materialized view that groups information at a coarser level of granularity than the granularity associated with restrictions contained in the queries allows queries that satisfy these conditions to be processed more efficiently than currently possible.

The rewritten query places a restriction along the same dimension as the restriction contained in the original query, but restriction in the rewritten query is at a coarser level of granularity than the restriction contained in the original query. For example, the restriction of the rewritten query may be in terms of months, while the restriction of the original query is in terms of days. The ordered dimension may be a well-established ordered dimension, such as time, or an ordered dimension defined by metadata.

GENERAL REWRITE ELIGIBILITY CONDITIONS

It should be noted that for any query rewrite mechanism to rewrite an aggregate query to access a materialized view, certain rewrite eligibility conditions must be satisfied. Rewrite eligibility conditions include those that are particular to the type of rewrites described herein, and eligibility conditions that are more general to the field of rewriting of aggregate queries. These more general conditions include, and are not limited to, data sufficiency and aggregate compatibility.

Data sufficiency is satisfied if all necessary columns of a query can be obtained using the data stored in the materialized view. If values from a column necessary for the processing of a query are not contained in the materialized view, then the data sufficiency condition is not satisfied.

Aggregate compatibility is satisfied if the aggregates in a summary are at the same or lower level than the level of aggregates in a query. For example, a sum of sales by month is at a lower level than a sum of sales by year. Therefore, the aggregate compatibility is satisfied if the summary has sum of sales by month and the query asks for sum of sales by year, but is unsatisfied if the summary has sum of sales by year and the query asks for sum of sales by month.

For purposes of exposition, the rewrites described herein assume that the more general eligibility rewrite conditions are satisfied. Thus, the general rewrite eligibility conditions are not described in detail in the rewrite illustrations provided herein.

AGGREGATE QUERIES THAT RESTRICT TO COINCIDING BOUNDS

When an aggregate query requests data and specifies a restriction along an ordered dimension at a particular level of granularity, and a summary table groups along the ordered dimension but at a coarser level of granularity, the query may be rewritten to access the summary table if bounds of the granules at the coarser level of granularity coincide with the bounds of those specified by the restriction.

For the purpose of illustration, assume that an aggregate query specifies a restriction based on a time column, and that the restriction specifies a range that begins with the first day of a year and ends with the last day of a year. This query may be rewritten to access a summary table that groups the data based on the same column, but at a coarser level of granularity that corresponds to years, because bounds of a year correspond to the bounds of the restriction specified by the aggregate query restriction. Specifically, a first day of a year corresponds to a beginning bound of a year, and the last day of a year coincides with the ending bound of a year.

Stated another way, an aggregate query can be rewritten to access a materialized view when: (1) the query has a restriction at a first level of granularity, (2) the query groups at a second, relatively coarser, level of granularity, and (3) if any second-level granule has any first-level descendent that satisfies the restriction, then all of the first-level descendents of the second-level granule must satisfy the restriction.

REWRITE EXAMPLES

FIG. 4 shows queries and a materialized view definition used to illustrate a rewrite of a query that places a restriction that specifies coinciding bounds. QBG 401 is an aggregate query that requests summarized data from sales table 250 (FIG. 2) grouped by column region 262. Where clause 403 specifies a restriction along the ordered time dimension, and in particular, specifies a restriction upon column date 260 to values between the days Jan. 1, 1997 and Dec. 31, 1999.

MVBG 421 is a summary table definition that reflects data from sales table 250. Specifically, MVBG 421 contains summary data that includes sums of values in column $Amt 266, grouped by the column region 262 and the output of function to_date as applied to column date 260. Function to_date is a function recognized by DBMSs developed by Oracle corporation. The function to_data extracts from a date field the components of a date e.g. day, month, or year. The function to_date is similar to the ANSI SQL function extract.

The function to_date as applied in MVBG 421 outputs a year. Thus, MVBG 421 groups data along the same ordered dimension referenced by the restriction specified by WHERE clause 403, except that in MVBG 421 data is grouped at a coarser level of granularity than that specified by WHERE clause 403.

The bounds of year granules correspond to bounds of days referenced by the restriction specified by WHERE clause 403. Thus, query 401 may be rewritten to QrwBG 441 (FIG. 4) to access MVBG 421. The WHERE clause 442 of QrwBG 441 is rewritten so that the restriction specified by WHERE clause 442 is based on years, and in particular, references column year 423 and coarser granules 1997 and 1999.

FIG. 5 show queries and a materialized view used to further illustrate a rewrite of a query that specifies a restriction with coinciding bounds. QBGQ 501 is an aggregate query that requests summary data from sales table 250 (FIG. 2) grouped by column region 262. WHERE clause 503 specifies a restriction upon an ordered time dimension, and in particular, restricts column date 260 to granules between the days Jan. 1, 1997 and Mar. 31, 1997.

MVBGQ 521 defines a summary table that contains summary data based on sales table 250. Like MVBG 421, MVBGQ 521 includes sums of values from $Amt 266 grouped by data from column region 262 and the output of function to_date applied to column date 266, except that MVBGQ 521 groups by quarter.

The bounds of the day granules in column data 266 that are referenced by the restriction specified by WHERE clause 403 correspond to bounds of quarter granules. Thus QBGQ 501 may be rewritten as QrwBGQ 541. The WHERE clause 503 of QBGQ 501 is rewritten to WHERE clause 543, which places restrictions based on quarters, the coarser granules by which data in MVBGQ 521 is grouped.

AGGREGATE QUERIES THAT RESTRICT TO NONCOINCIDING BOUNDS

According to an embodiment of the invention, techniques are provided for rewriting an aggregate query that specifies a restriction along an ordered dimension to access a summary table that groups by the same ordered dimension but according to coarser granules, even when the bounds of the restriction do not coincide with the bounds of the coarser granules.

Under such conditions, the query is rewritten as a union between two or more queries, where one of the queries in the union accesses the materialized view, and one or more other queries in the union access the fact table referenced by the original aggregate query. The rewritten query accessing the materialized view specifies a restriction along the ordered dimension but at a coarser level of granularity, referencing coarser granules, and reflecting a portion of the fact table that corresponds to data that falls within the bounds of the coarser granules. The one or more other queries access the fact tables for the remaining portion of the data that falls outside the bounds of the query referencing the materialized view, but within the bounds specified by the aggregate query.

FIG. 6A shows an aggregate query that specifies a restriction along an ordered dimension, and illustrates how such a query may be rewritten to access a summary table that also groups along the dimension but by coarser granules whose bounds do not coincide with the bounds of the restriction.

QUB 601 requests summary data from sales table 250 (FIG. 2) that includes sums of values in $Amt 266 grouped by region 262. WHERE clause 603 specifies a restriction on column date 260 to values between the days Dec. 15, 1991 and Jan. 31, 1997.

QUB 601 may be rewritten as union QU 643 (FIG. 6B), which is a union of queries 660, 670, and 680. Query 670 references MVBG 421. WHERE clause 678 specifies a restriction on column year 423 to between 1992 and 1996, a restriction along the same ordered time dimension as that specified by QUBQ 501, but at a coarser level of granularity. The results of query 670 only summarize a portion of the data requested by QUBQ 501, the remaining portion is reflected by queries 660 and 680.

Queries 660 and 680 reference the fact table referenced by QUBQ 501, that is sales table 250. Query 660 contains WHERE clause 668, and query 680 contains WHERE clause 688. WHERE clause 668 specifies a restriction along the same ordered time dimension as that of WHERE clause 603 and at the same level of granularity as that specified in WHERE clause 603. However, WHERE clause 668 specifies a date range that (1) begins at the beginning of the range specified in WHERE clause 603 of the original query, and (2) ends at the beginning of the start boundary of the restriction specified by query 670.

WHERE clause 688 restricts along the same ordered time dimension as that of WHERE clause 603 and at the same level of granularity as that specified in WHERE clause 603. However, WHERE clause 688 (1) begins at the end boundary of the restriction specified in WHERE clause 678, and (2) ends at the end of the range specified in WHERE clause 603 of the original query.

REFERENCING MULTIPLE MATERIALIZED VIEWS

An aggregate query specifying a restriction whose bounds do not coincide with the bounds of the coarser granules of any particular summary table may be rewritten as union of queries that each may reference a different summary table.

For example, referring to FIG. 6C, MVBGM 640 is a summary table definition that reflects data from sales table 250. Specifically, like MVBG 421, MVBGM 640 groups data along the same ordered dimension referenced by the restriction specified by WHERE clause 603 of QUB 601.

However, MVBGM 640 groups at a finer level of granularity than MVBG 421, a level of granularity that corresponds to months. Thus, referring to FIG. 6D, QUB 601 may be rewritten as a union between queries 660, 670, and 650.

SELECTION OF THE MATERIALIZED VIEW GROUPING AT A MORE COURSER LEVEL OF GRANULARITY

More than one materialized view may satisfy eligibility conditions relative to an aggregate query. In this case, to the degree that more than one materialized view may be used, the materialized view that groups data at the coarsest level of granularity is selected for rewrite purposes. The rewrite of QUB 601 demonstrates selecting the materialized view that groups results at the coarsest level of granularity. Either MVBG 421 and MVBGM 653 may have been used that supply the data corresponding to the range between Jan. 1, 1992 and Dec. 31, 1996 (i.e. the data supplied by query 670). However, MVBG 421 was selected because it grouped along the needed dimension at a courser level of granularity. Extracting data from the materialized view that groups data at the courser level of granularity requires less work than extracting from one that groups at a finer level of granularity, thus improving efficiency.

REWRITING QUERIES THAT REFERENCE USER DEFINED ORDERED DIMENSIONS

Rewriting queries to access materialized views that group along the same ordered dimension has been illustrated using an established dimension (the time dimension). This dimension is popularly defined. Various standard granules, dimension hierarchies, data types, functions, and rules have been established to support the ordered dimension. Thus, a database server may be configured to recognize queries grouping along the time dimension and materialized views grouping data along same dimension using the various standards, and how to rewrite queries under the conditions and in the manner described previously.

However, there are other useful ordered dimensions which have not been standardized. In order to rewrite aggregate queries to access a materialized view grouping along such dimensions, a mechanism is needed to describe the ordered dimension to a database management system.

ORDERED DIMENSION METADATA

Order dimension metadata is an example of such a mechanism. Ordered dimension metadata describes the hierarchical relationship and order between a set of granules in an ordered dimension. Specifically, order dimension metadata indicates the hierarchy between granules, the order between granules for each level of granularity, and the range of finer granules that each parent granule covers. Dimensions described by order dimension metadata may be referred to as "user defined ordered dimensions" because typically order dimension metadata is generated from user input.

Figure 7:
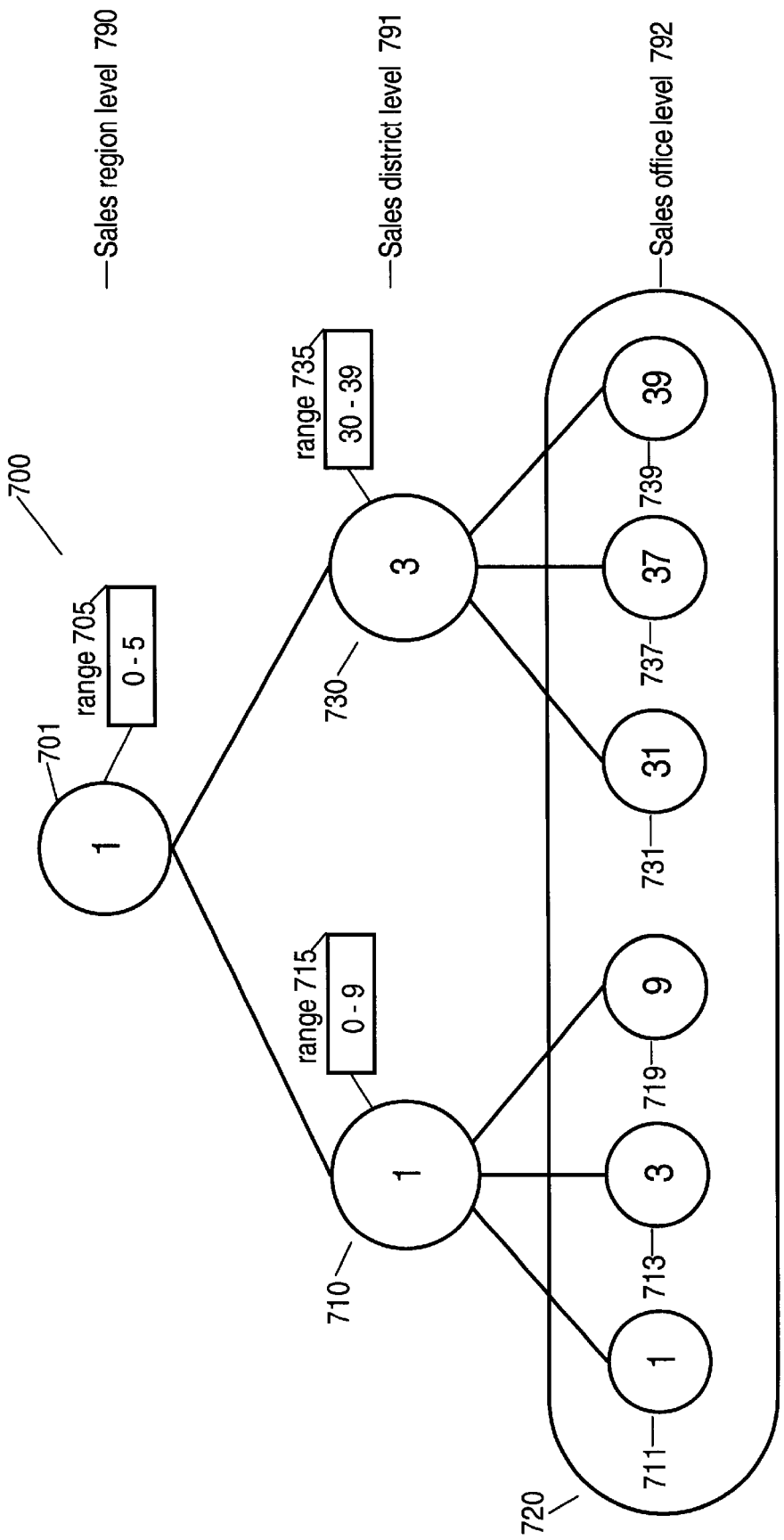
FIG. 7 is a block diagram depicting an hierarchy for an ordered dimension according to an embodiment of the present invention.

FIG. 7 shows dimension hierarchy 700 for user defined ordered dimension for sales offices. Node 701 represents a granule that corresponds to a sales region, and is associated with level of granularity sales region level 790. Nodes 710 and 730 represent granules that correspond to sales districts, and are associated with level of granularity sales district level 791. Nodes 720 correspond to granules that represent sales offices, and are associated with level of granularity sales office level 792. Granules at sales region level 790 are referred to as sales region granules, granules at sales district level 791 are referred to as sales district granules, and granules as sales office level 792 are referred to as sales office granules.

Sales district granule 1 is a parent granule for the sales office granules in range 715, i.e. values 0–9. Sales district granule 3 is a parent granule for the sales office granules in range 735, i.e. values 30–39. Sales region granule 1 is a parent granule associated with the range of sales district granules 0–5, i.e. range 705.

FIG. 8 shows a dimension table sales_location 801 for the dimension for the sales office dimension. Sales_location 801 includes columns sales_office 810, sales_district 812, and sales_region 814.

According to an embodiment of the present invention, order dimension metadata describes the hierarchical relationship between columns of sales_location 801, the range of finer granules corresponding to parent granules, and the order of granules in a particular level of granularity. These relationships may be described using the type of information depicted in chart 850 (FIG. 8).

Chart 850 includes the following vertical sections: dimension table column 852, child-of 854, granule section 856, parent granule range 858, and granule order 860. Section child-of 854 indicates that sales_office 810 is a child of sales_district 812, and sales_district 812 is a child of sales_region 814.

Granule order 860 shows that the level of granularity associated with sales_office column 810 (i.e. sales office level 792) is dictated by the values of granules in sales_office column 810, that the order within the level of granularity associated with sales_district 812 (i.e. sales district level 791) is dictated by the values of the granules in sales_district 812, and that the order within the level of granularity associated with sales_region column 814 (i.e. sales region level 790) is dictated by the values of granules in sales region column 814. Thus, for a particular level of granularity, the granules themselves explicitly dictate their order.

Sections granule 856 and range 858 shows that sales district granule 1 is associated with the range of sales office granules from 0–9, sales district granule 3 is associated with the range of sales office granules from 30–39 (i.e. range 735), and that sales region granule 1 is associated with the range of sales district granules 0–5, (i.e. range 705).

REWRITING AGGREGATE QUERIES BASED ON ORDERED DIMENSION METADATA

An aggregate query that groups data along a user defined ordered dimension may be rewritten to access a materialized view that also aggregates data along the same dimension, if the ordered dimension metadata indicates that the materialized view aggregates at a coarser level of granularity. Expository queries, table, and materialized view are provided to demonstrate such a rewrite.

FIG. 9A shows fact table office_sales 970, which includes office_location 972 and dollar_amt 974. Office_location 972 corresponds to the sales office level 792, and thus contains sales office granules. Query 901 is a aggregate query that groups along the sales office ordered dimension, and in particular, groups by office_location 972. WHERE clause predicate 903 specifies a restriction on column office_location 972 to values between 0 and 9. MVUB 921 groups along the sales office dimension, grouping by column sales_district 812.

According to one embodiment, a query rewrite mechanism examines ordered dimension metadata to detect a variety of eligibility conditions with respect to QUB 901 that indicate that QUB 901 may be rewritten to access the materialized view defined by MVUB 921. First, QUB 901 places a restriction on office_location 972 and MVUB 921 groups by sales_district 812. Thus, QUB 901 specifies a restriction upon the sales office ordered dimension, and materialized view MvUB 921 groups along that dimension. MVUB 921 groups at the relatively coarser sales district level, while the WHERE clause predicate 903 restricts along relatively finer sales office level. Finally, QUB 901 restricts sales_office 810 column to values between 0 and 9, the range that corresponds to sales district granule 1. Thus, QUB 901 may be rewritten to access MVUB 921 as QrwUB 941, with WHERE clause predicate 942. WHERE clause predicate 942 specifies a restriction on the sales district dimension limiting the dimension to sales district granule 1.

The present invention has been illustrated using granules whose order within a particular level of granularity corresponds to their values. However, other ordering mechanisms may be used. For example, a particular granule may be mapped to an ordinal number used to order the granules, or position within a list of granules may used to order them. Therefore, it is understood that present invention is not limited to any particular mechanism for ordering granules.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for processing queries, the method comprising the steps of:
    receiving an aggregate query that places a restriction on an ordered dimension;
    wherein said restriction is specified at a first level of granularity for the dimension;
    wherein said aggregate query does not reference a materialized view that groups results at a second level of granularity of the ordered dimension;
    wherein the second level of granularity is coarser than said first level of granularity;
    determining whether said materialized view satisfies each condition of a first set of conditions; and
    if said materialized view satisfies each condition in said first set of conditions, then rewriting said query to produce a rewritten query that references said materialized view and that includes a rewritten restriction that restricts said ordered dimension at said second level of granularity.

2. The method of claim 1, wherein said step of rewriting includes determining whether bounds of at least one coarser granule of said coarser granules coincide to bounds of said restriction.

3. The method of claim 2, wherein the step of rewriting includes if bounds of at least one coarser granule of said coarser granules coincide to bounds of said restriction, then rewriting said query to produce a rewritten query that references said at least one coarser granule.

4. The method of claim 2, wherein the step of rewriting includes rewriting said query to produce a union between a plurality of queries that include a first query and a second query, wherein:
    the first query references said materialized view and includes a restriction based on one or more of the coarser granules, and
    a second aggregate query that reflects data requested by said aggregate query but not data requested by said first query.

5. The method of claim 4, wherein the step of rewriting said query to produce a union between a plurality of queries includes producing said second aggregate query as an aggregate query that places a restriction on said ordered dimension, said restriction referencing at least one granule at said first level of granularity.

6. The method of claim 1, wherein ordered dimension metadata defines said ordered dimension;
    wherein the step of determining whether said materialized view satisfies each condition of a first set of conditions includes examining said ordered dimension metadata to determine whether said materialized view satisfies a condition that said materialized view groups results by coarser granules for the ordered dimension; and
    wherein the step of rewriting is based on said ordered dimension metadata.

7. The method of claim 1, wherein the step of receiving an aggregate query includes receiving an aggregate query that places a restriction that limits to a set of granules defined by one or more dimension tables.

8. The method of claim 1, wherein the step of receiving an aggregate query includes receiving an aggregate query that places a restriction on an ordered time dimension; and
    wherein the step of determining whether said materialized view satisfies each condition of a first set of conditions includes determining whether said materialized view satisfies a condition that said materialized view groups results by coarser granules for the ordered time dimension.

9. The method of claim 1,
    wherein the method further includes the step of determining that a second materialized view satisfies a second set of conditions; and
    wherein the first set of conditions includes that said second level of granularity by which said first materialized view groups results is coarser then the level of granularity of the ordered dimension at which said materialized view groups results.

10. A computer-readable medium carrying one or more sequences of one or more instructions for processing queries, the one or more sequences of one or more instructions including instruction which, when executed by one or more processors, cause the one or more processors to perform the steps of:
    receiving an aggregate query that places a restriction on an ordered dimension;
    wherein said restriction is specified at a first level of granularity for the dimension;
    wherein said aggregate query does not reference a materialized view that groups results at a second level of granularity of the ordered dimension;
    wherein the second level of granularity is coarser than said first level of granularity;
    determining whether said materialized view satisfies each condition of a first set of conditions; and
    if said materialized view satisfies each condition in said first set of conditions, then rewriting said query to produce a rewritten query that references said materialized view and that includes a rewritten restriction that restricts said ordered dimension at said second level of granularity.

11. The computer-readable medium of claim 10, wherein said step of rewriting includes determining whether bounds of at least one coarser granule of said coarser granules coincide to bounds of said restriction.

12. The computer-readable medium of claim 11, wherein the step of rewriting includes if bounds of at least one coarser granule of said coarser granules coincide to bounds of said restriction, then rewriting said query to produce a rewritten query that references said at least one coarser granule.

13. The computer-readable medium of claim 11, wherein the step of rewriting includes rewriting said query to produce a union between a plurality of queries that include a first query and a second query, wherein:

the first query references said materialized view and includes a restriction based on one or more of the coarser granules, and a second aggregate query that reflects data requested by said aggregate query but not data requested by said first query.

14. The computer-readable medium of claim 13, wherein the step of rewriting said query to produce a union between a plurality of queries includes producing said second aggregate query as an aggregate query that places a restriction on said ordered dimension, said restriction referencing at least one granule at said first level of granularity.

15. The computer-readable medium of claim 10, wherein ordered dimension metadata defines said ordered dimension;

wherein the step of determining whether said materialized view satisfies each condition of a first set of conditions includes examining said ordered dimension metadata to determine whether said materialized view satisfies a condition that said materialized view groups results by coarser granules for the ordered dimension; and wherein the step of rewriting is based on said ordered dimension metadata.

16. The computer-readable medium of claim 10, wherein the step of receiving an aggregate query includes receiving an aggregate query that places a restriction that limits to a set of granules defined by one or more dimension tables.

17. The computer-readable medium of claim 10, wherein the step of receiving an aggregate query includes receiving an aggregate query that places a restriction on an ordered time dimension; and wherein the step of determining whether said materialized view satisfies each condition of a first set of conditions includes determining whether said materialized view satisfies a condition that said materialized view groups results by coarser granules for the ordered time dimension.

18. The computer-readable medium of claim 10, wherein the computer-readable medium further including sequences of instructions for performing the step of determining that a second materialized view satisfies a second set of conditions; and wherein the first set of conditions includes that said second level of granularity by which said first materialized view groups results is coarser then the level of granularity of the ordered dimension at which said materialized view groups results.

19. A database system that processes queries, comprising:

said database system configured to receive an aggregate query that places a restriction on an ordered dimension;

wherein said restriction is specified at a first level of granularity for the dimension;

wherein said aggregate query does not reference a materialized view that groups results at a second level of granularity of the ordered dimension;

wherein the second level of granularity is coarser than said first level of granularity;

said database system configured to determine whether said materialized view satisfies each condition of a first set of conditions; and said database system configured to rewrite said query, when said materialized view satisfies each condition in said first set of conditions, to produce a rewritten query that references said materialized view and that includes a rewritten restriction that restricts said ordered dimension at said second level of granularity.

20. The database system of claim 19, wherein said database system is configured to rewrite by determining whether bounds of at least one coarser granule of said coarser granules coincide to bounds of said restriction.

* * * * *